Figure 1:
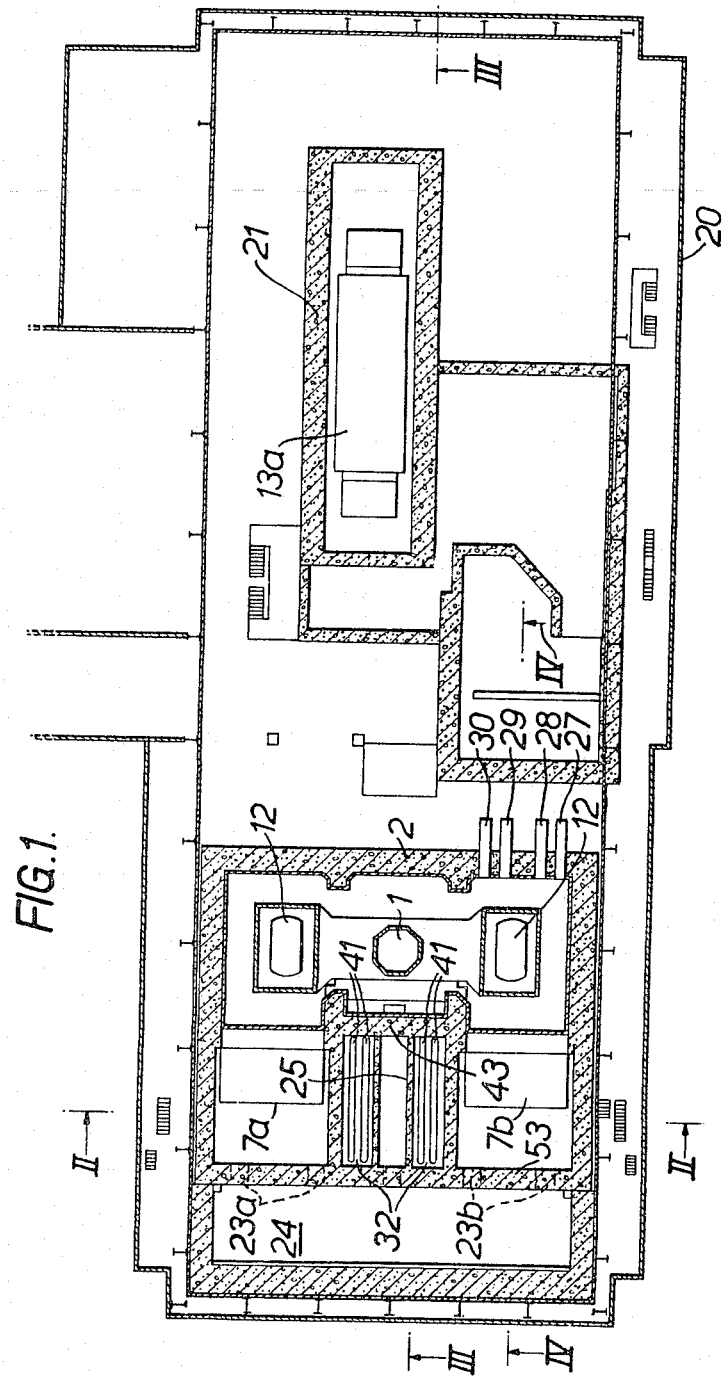

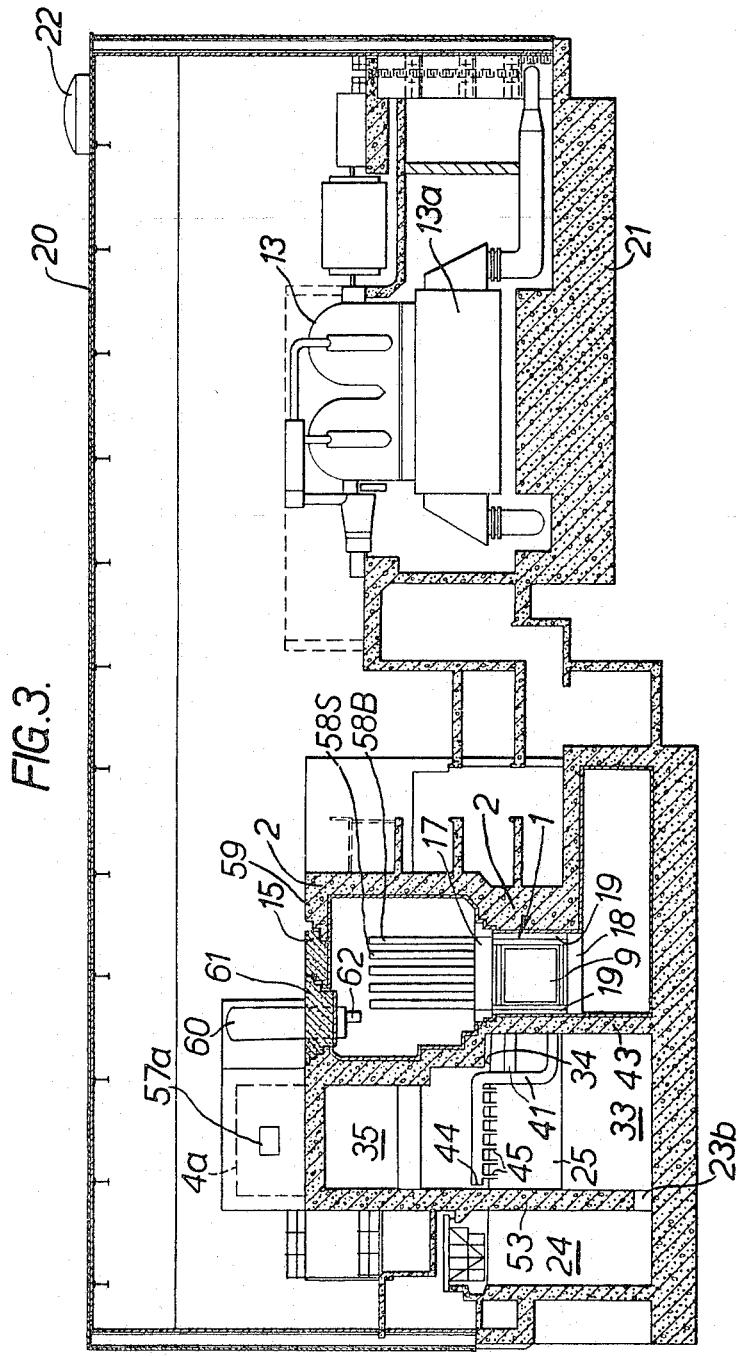

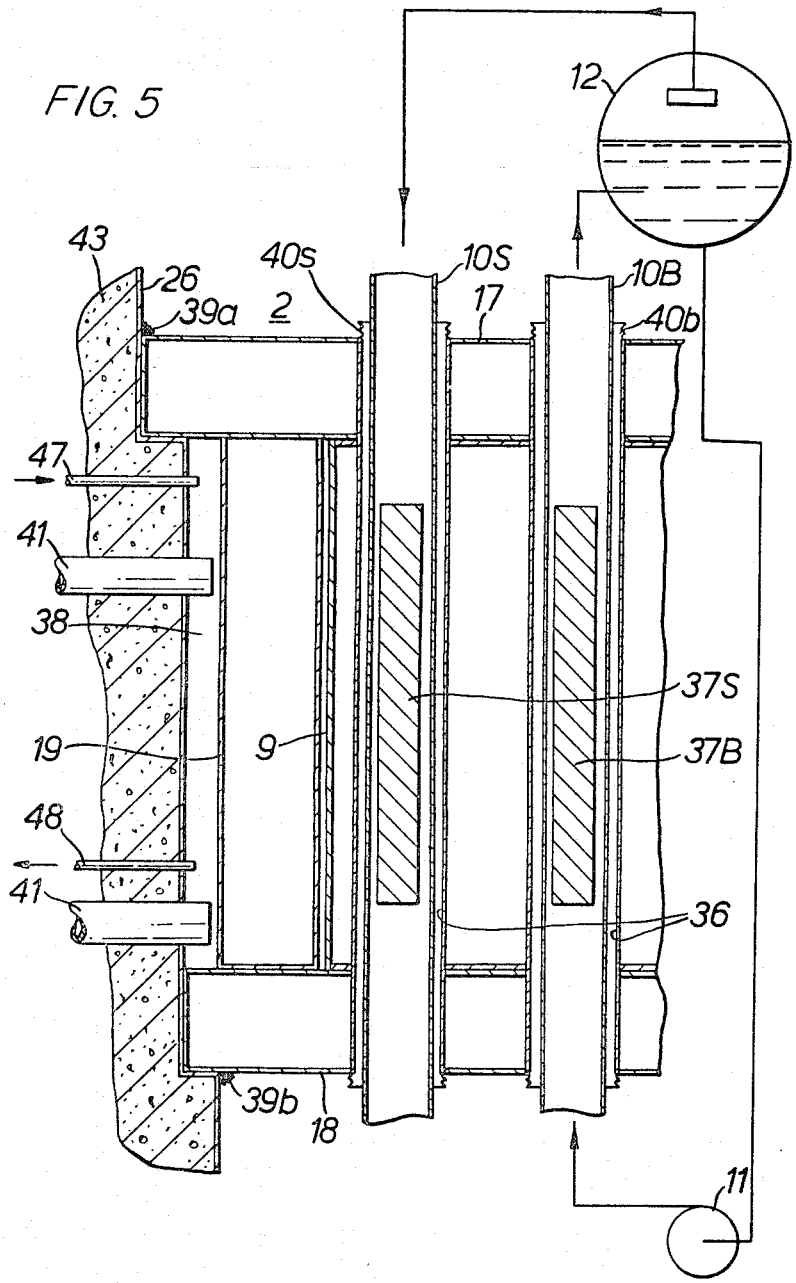

United States Patent Office 3,321,374
Patented May 23, 1967

3,321,374
CONTAINMENT SYSTEM FOR PRESSURIZED NUCLEAR REACTOR INSTALLATION
Geoffrey Vincent Windle, Bolton, Norman Bradley, Culcheth, Warrington, and Frank Geoffrey Johnsen, Hale Barns, England, assignors to United Kingdom Atomic Energy Authority, London, England
Filed Dec. 16, 1964, Ser. No. 418,785
Claims priority, application Great Britain, Dec. 16, 1963, 49,660/63
4 Claims. (Cl. 176—37)

This invention relates to pressurised nuclear reactor installations, that is, installations including nuclear reactors cooled by a pressurised coolant.

A problem associated with installations including such nuclear reactors is that of preventing radioactive contaminated coolant escaping from the reactor coolant circuit to the atmosphere. Although the possibility of such a circumstance arising is very unlikely, nevertheless, in the interests of safety it must be considered in the design of nuclear reactors.

The problem of containment has been met in one pressurised gas-cooled nuclear reactor system (see the article "ARG" in Nuclear Engineering, April 1961, pages 151 to 158) by providing a containment vessel capable of accepting all the coolant gas of the reactor system. This arrangement, however, is expensive because of the large containment vessel required and the complexity involved in its construction.

The problem has been further met in one pressurised water-cooled nuclear reactor system (see Nuclear Energy, June 1960, pages 263 to 266) by enclosing the reactor within an inner containment vessel disposed in turn within an outer containment vessel and providing a pool of water in the space between the inner and outer containment vessels. A vent duct extends from within the inner containment to below the surface of the pool, and, in the event of a breach of the reactor coolant circuit whereby steam is released, a pressure build-up of escaping steam is vented from the inner containment to the pool where solid and condensible radioactive contaminants are retained and heat is absorbed resulting in a reduction in pressure. Non-condensible gases such as air and non-condensible radioactive contaminants are prevented from escaping to the atmosphere by the outer containment vessel.

This latter arrangement allows a relatively smaller and hence less expensive (outer) containment vessel to be employed than that of the first described arrangement for meeting the problem but still requires a containment vessel capable of containing relatively high pressure.

According to the present invention, a nuclear reactor installation comprises a pressurised nuclear reactor, a sealed containment structure spaced from an enclosing said nuclear reactor, means defining a chamber outside of said containment structure, a pool of liquid contained within said chamber, means defining a vent duct extending from the interior of said containment structure to below the surface of said pool of liquid, means defining a port for communicating the interior regions of the chamber above the surface of the pool of liquid with the atmosphere, valve means for said port normally held in an open position, means for biassing said valve means towards a closed positions and pressure sensitive means for effecting release of said valve means when the pressure within the chamber exceeds a predetermined value.

The present invention is based on the concept of reactor coolant escaping through a large breach in the coolant circuit in two phases: a first uncontaminated phase of relatively large volume and relatively high pressure, followed by a second, contaminated phase of relatively small volume and relatively low pressure as the reactor loses its coolant and failure of the reactor fuel element sheaths takes place to release fission products. By venting air and uncontaminated coolant in the chamber to atmosphere before sealing off the chamber and preventing contaminated coolant from escaping, the chamber (which thereby becomes a secondary containment) may be of smaller size and hence is of lower cost than would otherwise be required to contain the discharge of coolant.

Figure 2:
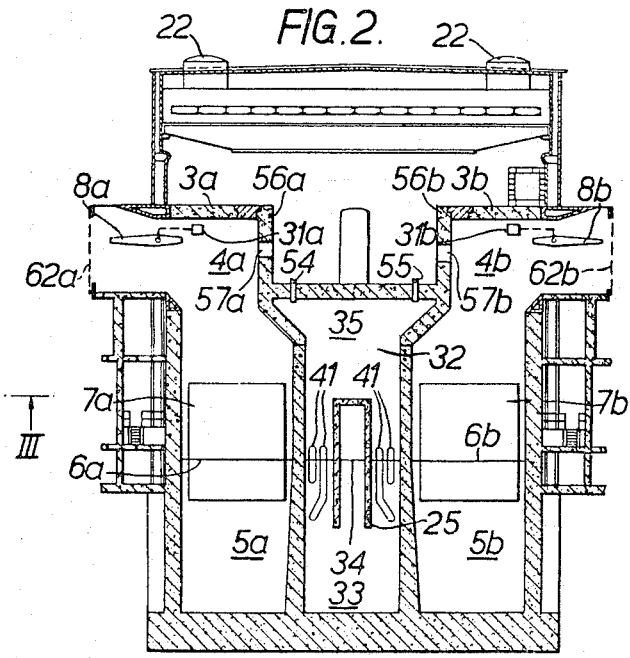
Figure 4:
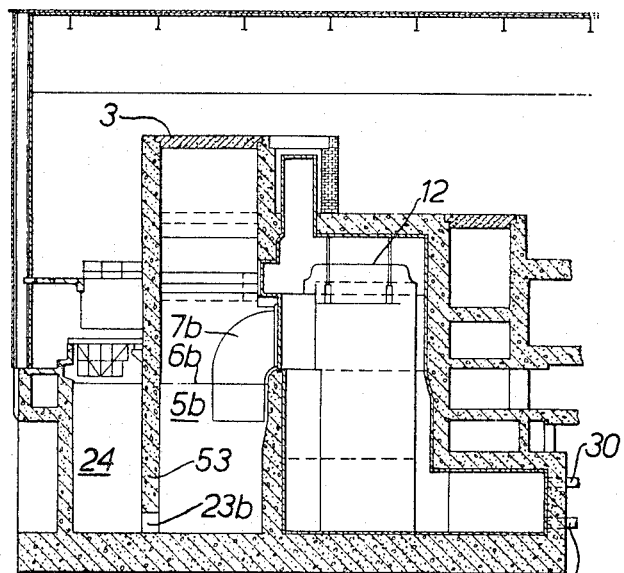

An embodiment of the invention will now be described by way of example with reference to the accompanying drawings where:

FIGURE 1 is a sectional plan view of a pressurised nuclear reactor installation, FIGURES 2, 3 and 4 are sections on the lines II—II, III—III and IV—IV respectively of FIGURE 1, and FIGURE 5 is a diagrammatic illustration.

Referring to FIGURES 1 to 4, a steam generating, heavy water moderated nuclear reactor 1 has a concrete containment structure 2 spaced from and enclosing the reactor 1, a concrete chamber 3a (shown in FIGURE 2 only) outside the containment structure 2, a pool 5a of water within the chamber 3a, the chamber having a port 4a above the surface 6a of the pool 5a and connecting the interior of the chamber 3a to the atmosphere, a vent 7a extending from within the containment structure 2 to below the surface 6a of the pool 5a, and a valve 8a disposed in the port 4a and arranged to close the port to atmosphere subsequent to venting of the containment structure 2 to the pool 5a.

In greater detail, the reactor 1 also has associated with the containment structure 2 a concrete chamber 3b, a pool 5b having level 6b, an outlet port 4b, a vent 7b and a valve 8b similar in all respects to elements 3a, 5a, 4a, 7a and 8a respectively. The chambers 3a, 3b, are separated by a closed concrete chamber 32 having a pool 33 of water within the chamber 32 of level 34 (corresponding to the levels 6a, 6b of the pools 5a, 5b alongside) leaving a free space 35 above the surface of the water.

Referring more particularly to FIGURE 5, the reactor 1 is of the pressure tube and calandria type wherein the calandria vessel 9 contains the heavy water moderator and is penetrated from top to bottom by a lattice of one hundred and twelve calandria tubes 36, one hundred and four of which each locate a "boiling" pressure tube 19B and the remaining eight each locate a "superheat" pressure tube 10S. The pressure tubes 10B, 10S locate sheathed nuclear fuel elements 37B and 37S respectively and water at near saturation temperature is fed by pumps 11 to the lower ends of the pressure tubes 10B where boiling takes place as the water passes upwardly over the fuel elements 37B contained within. Steam and water mixtures is then led from the upper end of the tubes 10B to two steam drums 12 (one only being shown in FIGURE 5) where the steam is separated out to be passed downwardly through the tubes 10S to receive superheat by heat exchange with the fuel elements 37S before passage to a turbo-alternator set 13 (FIGURE 3) to perform useful work. The alternator set 13 has a condenser 13a enclosed in concrete shielding 21.

The calandria vessel 9 is enclosed by upper, lower, and side shield tanks 17, 18 and 19 respectively containing light water. The shield tanks are spaced from the vessel 9 and from each other, to define, with the pressure tubes 10B, 10S, an irregularly-shaped reactor core space 38. The reactor core space 38 is sealed off from the remaining interior of the containment structure 2 by seals 39a, 39b between the shield tanks 17, 18, and the adjacent wall 43 of the containment structure 2 and by seals 40b, 40s, between the pressure tubes 10B and 10S and the calandria tubes 36. Four vent ducts 41 extend from the space 38 through the above mentioned side wall 43 to enter the free space 35 (FIGURES 2 and 3) in the central chamber 32. The ends of the ducts 41 within the free space 35 have closed ends 44 (FIGURE 3 only) and open-ended branches 45 extend downwardly from the ducts 41 to below the surface 34 of the pool 33 within the chamber 35. Carbon dioxide gas is circulated through the core space 38 by way of an inlet 47 and an outlet 48 penetrating the side wall 43. The seals 39a, 39b, 40b, 40s, sealing off the core space 38 from the remainder of the containment structure 2 are strong enough to withstand pressure differentials of the order of 8 p.s.i.g.

Referring now to FIGURE 3, the containment structure 2, the chambers 3a, 3b, 32 and alternator set 13 are all enclosed in a turbine hall 20, which has volume approximately ten times that of the containment structure 2. The hall 20 is of cladded construction, the cladding being sealed to the structural steelwork and the windows being omitted to enable the hall to retain low pressures (for example of the order 0.1 p.s.i.g.). The pools 5a, 5b and 33 are adjacent one end of the hall 20 and mounted on the roof adjacent the opposite end are two relief valves 22 which open to atmosphere when pressures within the hall 20 exceed 0.072 p.s.i. (2" water gauge).

Adjacent the pools 5a, 5b and connected therewith by openings 23a, 23b, in the side wall 53 common to the chambers 3a, 3b, 32, is a fuel element storage or "cooling" pond 24. The openings 23a, 23b, provide that the levels of the pools 5a, 5b and storage pond 24 are the same. A fuel element transfer tunnel 25 of concrete extends through the chamber 32 to connect the containment structure 2 with the storage pond 24.

The walls of the containment structure 2 are thick enough to withstand internal pressure up to 8 p.s.i.g. Inlet and outlet ducts 27, 28 extending to and from the containment structure 2 allow air to be passed through the structure 2 and then discharged through a stack (not shown) to atmosphere. A similar pair of ducts 29, 30 allows air to be passed through the structure 2 and then to be discharged to a decontamination plant (not shown). Ducts 54, 55 (FIGURE 2 only) similar to the ducts 29, 30 allow air to be passed through the free space 35 of the chamber 32 and then to be discharged to the aforementioned decontamination plant.

The valves 8a, 8b are of the dead weight activated type and are normally held in the open position by pressure responsive latch mechanisms 31a, 31b. If the pressure in the ports 4a, 4b rises to a value higher than a predetermined value the latch mechanisms are tripped.

The side walls 56a, 56b of the ports 4a, 4b are penetrated by apertures 57a, 57b which connect the interiors of the chambers 3a, 3b with the interior of the turbine hall 20.

The upper ends of the pressure tubes 10B, 10S have standpipe connections 58B, 58S (FIGURE 3 only) which terminate below a roof 59 of the containment structure 2. A refueling machine 60 is rotatably mounted in a shield plug 61 rotatable in the roof 59 and the machine has a lower end 62 engageable with the upper ends of the standpipes 58B, 58S. The bores of the standpipes are normally pressure-sealed by seal plugs which are removable (for refueling operations) by seal plug handling equipment housed within the refueling machine 60.

In the unlikely event of a breach developing in those parts of the reactor coolant circuit outside the sealed-off core space 38 (for example, a stand pipe), the containment structure 2 quickly fills with steam and water escaping from the reactor. The escaping coolant, together with air present in the containment structure 2, discharges through the vents 7a, 7b to below the surfaces of the pools 5a, 5b which act as heat sinks to condense most of the steam and retain the water phase of the reactor coolant. The fuel element pond 24 serves as an expansion tank for the pools 5a, 5b during the initial pressure build up in the vent ducts 7a, 7b immediately before the vents discharge to the pools. Air and uncondensed steam bubble to the surfaces of the pools, increasing the pressure within the chambers 3a, 3b, and a major proportion of the air and steam escapes to atmosphere through the ports 4a, 4b forcing out the air present in the chambers 3a, 3b in passage therethrough. The remaining smaller proportion of air and steam escapes to the interior of the turbine hall 20, by way of the apertures 57a, 57b. Meanwhile the reactor 1 is shut down by the usual safety devices sensitive to loss of reactor coolant pressure.

The pressure responsive latch mechanisms respond to the increased pressure in the chambers 3a, 3b and trip. The valves 8a, 8b remain open for a period of approximately twenty seconds duration being held by the pressure of the outflow of air and steam from the ports 4a, 4b, then as the pressure falls, the valves 8a, 8b close to seal off the chambers 3a, 3b from the atmosphere. Escaping steam and air continue to leave the chambers 3a, 3b, however, to enter the turbine hall 20 by way of the apertures 57a, 57b.

It is estimated that, following a very large breach of the coolant circuit of the reactor 1, twenty seconds will elapse before significant releases of fission products take place. This twenty seconds period allows all the air present in the containment structure 2 and chambers 3a, 3b and also a large volume of the reactor coolant to be released to the atmosphere before any significant release of fission products takes place. Thereafter, with the valves 8a, 8b closed, escaping coolant (probably contaminated) enters the turbine hall 20 (via the apertures 57a, 57b) which is of large enough volume (for example 1,500,000 cu. ft.) to allow the escaping coolant to expand to a very low pressure (e.g. .06 p.s.i.g.). The hall is capable of retaining such low pressure without significant leakage.

If the pressure within the turbine hall 20 is high enough to cause the relief valves 22 to open, the large volume of uncontaminated air between the valves 22 and the pools 5a, 5b has first to be displaced through the valves 22 before any contaminated steam, air, or steam and air mixture arrives at the relief valves 22. The volume of the turbine hall 20 is large enough to ensure that, in foreseeable circumstances, by the time any contaminants arrive at the relief valves 22 the internal pressure of the hall 20 is low enough to allow the valves to re-seat.

After the incident, the turbine hall may be de-contaminated by hosing down and the interior of the containment structure 2 may be also de-contaminated by circulating air through the ducts 29, 30.

In the event of a breach developing in those parts of the reactor coolant circuit (for example, a pressure tube 10B or 10S) within the boundary of the sealed-off core space 38, the space 38 will quickly fill with steam or steam and water mixture which will be discharged through the ducts 41 to below the surface of the pool 33. The pool will act as a heat sink to condense most of the steam and reduce the temperature of the water. A breach of the reactor coolant circuit within the boundaries of the core space 38 would not be expected to release as large a volume of non-condensible gases as a breach outside the space 38. A "core space" breach may well, however, be accompanied by an immediate release of fission products as one or more fuel elements melt out due to loss of coolant. Should a "core space" breach develop, condensible fission products are retained in the pool 22 and noncondensible fission products are retained in the free space 35 above the pool 33 where they can be "cleaned-up" by circulation of air through the ducts 54, 55.

In a modification the ducts 41 extend from the containment 2 to above the pool 33 in the chamber 32, the chamber 32 communicates with the chambers 3a, 3b and the ports 4a, 4b housing the valves 8a, 8b are sealably closed by bursting panels shown in FIG. 2 in broken line and designated 62a, 62b. The bursting panels are secured to the port structure by magnetic restraint means arranged so that in the event of a pressure increase in the ports 4a, 4b to the predetermined value at which the pressure response latch mechanism operate, the magnetic restraint is overcome to release the bursting panels. The modification provides that if a low pressure increase occurs in the chambers 3a, 3b, 32 such as would be caused by a breach in the coolant circuit within the boundary of the sealed off core space, the chambers 3a, 3b, remain sealably closed and the released radio-actively contaminated gases are retained within the chambers 3a, 3b, 32 and the turbine hall 20.

Further details of the reactor 1 and ancillary equipment are as follows:

"Boiling" tubes 10B

| | |
|---|---|
| Temperature of feed water at inlets °C | 280 |
| Pressure of feed water at inlets p.s.i.g | 925 |
| Steam/water flow lb./hr | $1.4 \times 10^5$ |
| Cross-sectional area of steam/water flow path ft.$^2$ | .064 |

"Superheat" tubes 10S

| | |
|---|---|
| Temperature of steam at outlets °C | 540 |
| Pressure of steam at outlets p.s.i.g | 900 |
| Steam flow lb./hr | $2.18 \times 10^4$ |
| Cross-sectional area of steam flow path ft.$^2$ | .052 |

Vent ducts 7a, 7b

| | |
|---|---|
| Cross-sectional area of each duct sq. ft. | 150 |
| Submerged depth of each duct ft. | 4 |

Pools 5a, 5b

| | |
|---|---|
| Depth of pool ft. | 35 |
| Volume of pool cu. ft. | 21,800 |

Pool 33

| | |
|---|---|
| Depth of pool ft. | 35 |
| Volume of pool cu. ft. | 16,700 |

Containment 2

| | |
|---|---|
| Internal free space cu. ft. | 159,000 |
| Wall thickness (reinforced concrete) ft. | 4 |
| Max. designed pressure p.s.i.g. | 8 |

Chambers 3a, 3b

| | |
|---|---|
| Wall thickness (reinforced concrete) ft. | 4 |
| Maximum designed pressure p.s.i.g. | 6 |

Ports 4a, 4b

| | |
|---|---|
| Cross-sectional area of each port sq. ft. | 200 |

Port by-pass apertures 57a, 57b

| | |
|---|---|
| Maximum designed outflow lb./sec. (air) | 500 |

Relief valves 22

| | |
|---|---|
| Cross-sectional area of each outlet sq. ft. | 100 |

We claim:

1. A nuclear reactor installation comprising, a pressurised nuclear reactor, a sealed containment structure spaced from and enclosing said nuclear reactor, means defining a chamber outside of said containment structure, a pool of liquid contained within said chamber, means defining a vent duct extending from the interior of said containment structure to below the surface of said pool of liquid, means defining a port for communicating the interior regions of the chamber above the surface of the pool of liquid with the atmosphere, valve means for said port normally held in an open position, means for biassing said valve towards a closed position and pressure sensitive means for effecting release of said valve means when the pressure within the chamber exceeds a predetermined value.

2. A nuclear reactor installation comprising, a pressurised nuclear reactor, a first sealed containment structure spaced from and enclosing said nuclear reactor, means defining a chamber outside of said first containment structure, a second sealed containment structure outside of said chamber, a pool of liquid contained within said chamber, means defining a vent duct extending from the interior of said first containment structure to below the surface of said pool of liquid, means defining a port for communicating the interior regions of said chamber above the surface of said pool of liquid with the atmosphere, valve means for said port normally held in an open position, means for biasing said valve means towards a closed position, pressure sensitive means for effecting release of said valve means when the pressure within the chamber exceeds a predetermined value, fluid flow duct means disposed above the surface of the pool of liquid for effecting restricted fluid flow between said chamber and said second containment structure and to effect balancing of pressure therebetween.

3. A nuclear reactor installation comprising, a pressurised nuclear reactor, a first sealed containment structure spaced from and enclosing said nuclear reactor, means defining a chamber outside of said first containment structure, an elongated second sealed containment structure outside of said chamber, a pool of liquid contained within said chamber, means defining a vent duct extending from the interior of said first containment structure to below the surface of the pool of liquid, means defining a port for communicating the interior regions of said chamber above the surface of said pool of liquid with the atmosphere, valve means for said port normally held in an open position, means for biasing said valve means towards a closed position, pressure sensitive means for effecting release of said valve means when the pressure within the chamber exceeds a predetermined value, fluid flow duct means disposed above the surface of the pool of liquid and communicating said chamber with a first end region of said elongate second containment structure for effecting restricted fluid flow between said chamber and said elongate second containment structure and to effect balancing of pressure therebetween, and pressure relieving means for communicating a second end region of the elongate second containment structure which is remote from said first end region with the atmosphere for limiting the pressure within the second containment structure to a predetermined maximum value.

4. An electrical power producing plant comprising, a pressurised nuclear reactor, a first sealed containment structure spaced from and enclosing said nuclear reactor, means defining a chamber outside of said first containment structure, an elongate second sealed containment structure outside of said chamber, a pool of liquid contained within said chamber, means defining a vent duct extending from the interior of said first containment structure to below the surface of the pool of liquid, means defining a port for communicating the interior regions of said chamber above the surface of said pool of liquid with the atmosphere, valve means for said port normally held in an open position, means for biasing said valve means towards a closed position, pressure sensitive means for effecting release of said valve means when the pressure within the chamber exceeds a predetermined value, fluid flow duct means disposed above the surface of the pool of liquid and communicating said chamber with a first end region of said elongate second containment structure for effecting restricted fluid flow between said chamber and said elongate second containment structure and to effect balancing of pressure therebetween, and pressure relieving means for communicating a second end region of the elongated second containment structure which is remote from said first end region with the atmosphere for limiting the pressure within the second containment structure to a predetermined maximum value, and electricity generating plant housed within said elongate second containment structure.

References Cited by the Examiner

UNITED STATES PATENTS

| | | | |
|---|---|---|---|
| 3,115,450 | 12/1963 | Schanz | 176—37 |
| 3,151,034 | 9/1964 | Douglass et al. | 176—53 |
| 3,248,298 | 4/1966 | Norman | 176—37 |
| 3,253,996 | 5/1966 | Bond et al. | 176—37 |
| 3,258,403 | 6/1966 | Malay | 176—37 |
| 3,301,761 | 1/1967 | Johnson et al. | 176—37 |

FOREIGN PATENTS

| | | |
|---|---|---|
| 862,627 | 3/1961 | Great Britain. |

L. DEWAYNE RUTLEDGE, *Primary Examiner.*

CARL D. QUARFORTH, *Examiner.*